UNITED STATES PATENT OFFICE.

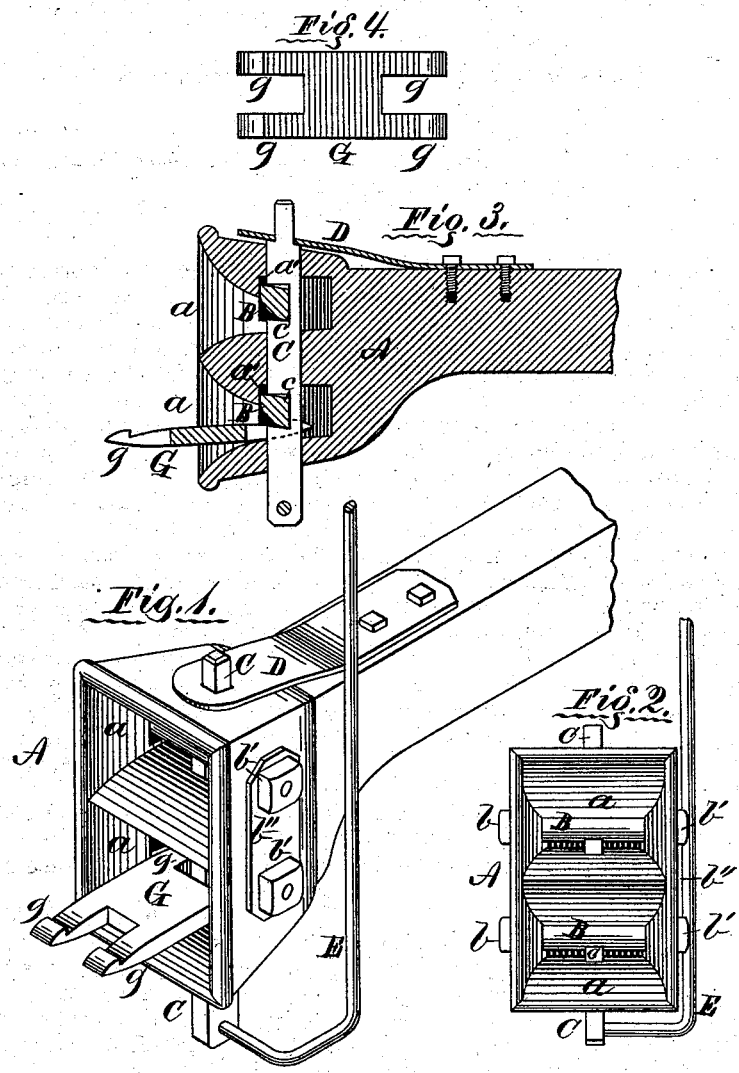

SOLOMON DAILEY, OF HENDERSON, ILLINOIS, ASSIGNOR OF ONE-HALF HIS RIGHT TO ELIZA A. BROWN, OF SAME PLACE.

IMPROVEMENT IN CAR-COUPLINGS.

Specification forming part of Letters Patent No. 155,502, dated September 29, 1874; application filed July 22, 1874.

*To all whom it may concern:*

Be it known that I, SOLOMON DAILEY, of Henderson, in the county of Knox and State of Illinois, have invented certain new and useful Improvements in Car-Couplings, of which the following is a specification:

The nature of my invention relates to improvements in automatic couplings for railway-cars; and the invention consists in the arrangement of catch-bars within a double-mouthed draw-bar, connected in such manner that their movements may be simultaneous, and so that both may be operated by one spring, and also so that both may be raised by a rod extending to the side and top of the car, all as hereinafter fully described.

To enable others skilled in the art to make and use my invention, I will now proceed to describe the same with reference to the accompanying drawings, in which—

Figure 1 is a perspective view of a draw-head embodying my invention. Fig. 2 is a front elevation of Fig. 1. Fig. 3 is a vertical sectional view of Fig. 1, and Fig. 4 is a top-plan view of the coupling link or hook.

Referring to the parts by letters, letter A represents a draw-head, constructed, as plainly shown in the drawings, with two mouths, *a a*, one immediately over the other, and the entrance to each made bell-shaped in the usual manner, and with a shouldered part, *a'*, as shown at Fig. 3. B B are transverse bars, their forward sides inclined, as shown at Fig. 3, and their ends extending outward through perforations in the side walls of the draw-head, where they are secured by heads *b* and nuts *b'*, said perforations being elongated vertically to allow the bars a reciprocating vertical movement. The ends of the bars B are connected by bars *b''*. C is a bar extending vertically through the draw-head A, and has recesses *c c* in its front side, in which the bars B rest, its upper end contracted and passed through a hole in a spring-bar, D, so that when it is raised the spring D will press it back to its place. E is a curved bar, connected at one end to the lower projecting end of the bar C, and thence extending outward to the side of the car, or any other desirable place. G is the coupling-hook, its ends formed into arms *g g*, having dart or hook shaped ends, as shown in the drawings.

The operation is deemed obvious to those skilled in the art.

The hook-bar G may be sustained in the upper or lower mouth, as shown at Fig. 3, and, entering an adjacent bumper or draw-head, will press upward the bar B until its dart-shaped heads pass the rear side of the bar B, when the spring D will press it downward and cause it to engage therewith. The front sides of the bars B, resting against the shoulders *a'*, will secure them against the strain incident to pulling the cars.

The bell-shaped mouths *a a* and the inclined forward sides of the bars B, as shown at Fig. 3, will facilitate the entrance of the coupling-hook.

The bar E may be taken hold of to uncouple the draw-heads by raising it, and thus elevating the bars B in the obvious manner.

I am aware of the Letters Patent granted to Philip Swineford, October 21, 1873, and do not claim the device patented by him.

What I claim as my invention, and desire to secure by Letters Patent, is—

The notched vertical bar C and lateral bars B B, to be operated by the spring D and bar E, for the purpose of receiving, holding, and releasing the double-ended coupling-bar G *g g*, all combined as set forth.

SOLOMON DAILEY.

Witnesses:
J. J. TUNNICLIFF,
M. H. BARRINGER.